United States Patent Office 2,777,819
Patented Jan. 15, 1957

2,777,819

LUBRICATING COMPOSITIONS

Paul H. Williams, Berkeley, and Francis C. Younger, El Cerrito, Calif., assignors to Shell Development Company, New York, N. Y., a corporation of Delaware No Drawing. Application April 27, 1954, Serial No. 426,025

3 Claims. (Cl. 252—32.5)

This invention relates to lubricants, and particularly to lubricating compositions which are suitable for use in equipment operating under extreme conditions, such as under extreme pressure, variable speed and wide temperature conditions.

It has been observed that certain types of phosphorus acids as defined more specifically hereinafter, impart outstanding extreme pressure properties to various lubricating compositions. However, these very effective agents in general are not sufficiently oil-soluble and are undesirably corrosive themselves for satisfactory utility. The phosphorus acids referred to can be represented by the general formula:

(I)

wherein R is a halohydrocarbyl and preferably a perhalohydrocarbyl radical, in which the carbon chain can range from 1 to 30 and preferably from 1 to 10 carbon atoms; X can be the same or different divalent atoms of a non-metallic element of group VI B of the periodic table of elements; of which the elements O and S are preferred; and Y is hydrogen, a hydrocarbyl radical or R as defined, or XH as defined.

Even those phosphorus acids of the defined class which have sufficient oleophilic character to provide sufficient initial oil-solubility tend to precipitate from oil solution on standing and to form a solid sludge much the same as the more sparingly soluble acids. This undesirable tendency on the part of the phosphorus acids tends to deprive the base oil of the intended beneficial properties.

The organic phosphonic and phosphinic acids having the above general formula can be prepared by a number of suitable methods such as reported by Arbuzov (J. Gen. Chem. (USSR)); 4, 898—900 (1934); Coover (Organic Chemical Bulletin, vol. 23, No. 4, 1951); Kosofapoff's "Organic Phosphorus Compounds" (Wiley and Sons); and in U. S. Patents 2,559,752 and 2,614,990. Compounds of this type include halo-organo phosphinic and phosphonic acids such as halohydrocarbon phosphinic acid, halohydrocarbon phosphonic acids and more specifically the haloalkanephosphinic and haloalkanephosphonic acids.

It has now been discovered that the phosphorus acids discussed above can be effectively solubilized in oleophilic base oils without detracting from their extreme pressure and load carrying properties while at the same time inhibiting their corrosive tendencies by utilizing the acids in the form of an amine salt wherein the amine is a higher highly branched primary aliphatic amine of at least 8 carbon atoms, preferably primary amine which can be 1,1 or 2,2-dialkyl alkyl amine containing a tertiary or quaternary carbon atom in the molecule as represented by the formulas:

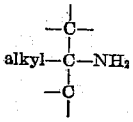

or

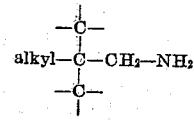

(II)

Primary amines for use in forming the salts of this invention can be prepared by any suitable means such as described in the U. S. Office of the Publication Board Report No. 88843 or by converting primary branched chain alcohols as produced by the Oxo process from branched chain olefins as fully described by P. W. Sherwood in the Oil and Gas Journal, June 9, 1949, page 71 and in the February 1953 issue of Petroleum Processing, to the corresponding nitriles and converting the nitrile to the amine by catalytic hydrogenation. Another method is to convert alcohols to the corresponding halides and forming the amines derived from the halide in the customary manner such as by reacting with ammonia.

It has been found that the tertiary alkyl primary amines, containing as the tertiary alkyl radical the radical of the polyisobutylene, polypropylenes and mixtures thereof are particularly effective for the present purpose and they constitute a preferred class of amines for the practice of the invention. Accordingly, 1,1,3,3-tetramethylbutylamine (from the amination of diisobutylene), 1,1,3,3,5,5-hexamethylhexylamine (from triisobutylene), 1,1,3,3,5,5,7,7-octamethyloctylamine (from tetraisobutylene) and 1,1,3,3,5,5,7,7,9,9-decamethyldecylamine (from pentaisobutylene) are specific preferred amines, which are suitably used individually or as admixtures thereof. In addition to these tertiary alkyl primary amines, 2,2,4,4-tetramethyl pentylamine, 2,2,4,4,6,6-hexamethyl heptylamine and the like can be used.

Other tertiary branched-chain alkyl primary amines which can be used include the $C_8$ and higher amines of this type mentioned in U. S. Patents 2,160,058, 2,606,923 and 2,611,782 such as

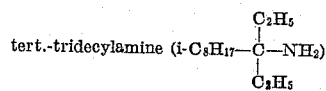

as well as isoheptyldiethylcarbinylamine, isooctylethylpropylcarbinylamine, and the like. Primary amines of this type are commercially available from Rohm and Haas Co. under the trade name of "Primenes."

The following are the properties of some amines which can be used to form the amine salts for use in lubricating compositions of this invention.

TABLE I
Properties

|  | Tertiary-Octylamine | $A_1$ | $A_2$ | $A_3$ |
|---|---|---|---|---|
| Formula | t-$C_8H_{17}NH_2$ | Principally t-$C_{12}H_{25}NH_2$ to t-$C_{15}H_{31}NH_2$. | Principally t-$C_{12}H_{25}NH_2$ to t-$C_{15}H_{31}NH_2$. | Principally t-$C_{18}H_{37}NH_2$ to t-$C_{24}H_{49}NH_2$. |
| Molecular Weight | 128 | Principally 185–227 | Principally 182–227 | Principally 269–353. |
| Average Molecular Weight | 131 | 191 | 208 | 301. |
| Specific Gravity, 25° C | 0.771 | 0.812 | 0.833 | 0.828. |
| Refractive Index, 25° C | 1.423 | 1.447 | 1.449 | 1.455. |
| Boiling Point (or Range) | 137–143° C. (760 mm.) | 5–90% at 210–227° C. (760 mm.). | 4–90% at 204–245° C. (760 mm.). | 5–95% at 275–340° C. (765 mm.). |

The phosphorus acids used to form the partial or full amine salts include such compounds as haloalkanephosphinic acids and haloalkanephosphonic acids such as trichloromethanephosphinic acid, trichloromethanethiophosphinic acid, 1,1 - dibromoethanephosphinic acid, 3,3,5-trichlorocyclohexanephosphinic acid, 1,1 - dichlorohexadecanephosphinic acid, 1,1 - dichlorohexadecanephosphinic acid; trichloromethanephosphonic acid, 1,1-dichloroethanephosphonic acid, 2,2,2 - trichloroethanephosphonic acid, tribromomethanephosphonic acid, dichloromonobromomethanephosphonic acid, 1,1 - dibromobutanephosphonic acid, 1,1 - dichlorophenylethanephosphonic acid, 3,3,5 - trichlorocyclohexanephosphonic acid, 3,5 - dichlorocyclohexanephosphonic acid, 1,1-dichloropropanephosphonic acid, 3,3,3 - tribromopropanephosphonic acid, 1,1 - dichloroethanephosphonic acid, 1,1 - dichlorobutanephosphonic acid, dichlorophenyl benzenephosphonic acid, 1,1 - dichloro - 2 - monobromobutanephosphonic acid, 1,1 - dichlorooctanephosphonic acid, trichloromethanethiophosphonic acid, 1,1 - dibromobutanethiophosphonic acid, 3,3,5 - trichlorocyclohexanethiophosphonic acid, 1,2 - dichloroethanethiophosphonic acid, trichloromethaneselenophosphonic acid, and the like.

The phosphorus acid salts can be represented by the general formulas:

$$R-\overset{X}{\underset{}{P}}\begin{matrix}XH\cdot A\\XH\end{matrix} \quad (III)$$

$$R-\overset{X}{\underset{}{P}}\begin{matrix}XH\cdot A\\XH\cdot A\end{matrix} \quad (IV)$$

and $$\begin{matrix}R\\\phantom{R}\\R_1\end{matrix}\overset{X}{\underset{}{P}}-XH\cdot A \quad (V)$$

wherein R and X are the same as in Formula I; $R_1$ can be hydrogen or R as defined, and A is a long-chain highly branched aliphatic primary amine, preferably having at least 8 carbon atoms and higher such as up to 30 carbon atoms and being a tertiaryalkyl amine.

The amine salts of the acidic phosphono compounds and mixtures thereof as described can be prepared by interacting selected amines with polyhalo-organo phosphorus compounds as described above, as in a suitable solvent or in the presence of water and under suitable conditions such as mixing at room temperature, stirring or heating. Salts produced in the foregoing or equivalent manner can be purified by recrystallization from suitable solvents or other means which will be apparent to those skilled in the art. For example, in a suitable vessel trichloromethanephosphonic acid was reacted at a temperature of around 50° C. with t-$C_{18}H_{37}NH_2$ to t-$C_{24}H_{49}NH_2$ ($A_3$) in an amount sufficient to neutralize the total acidity of the acid, namely one molecule of the acid was reacted with two moles of the amine. The product formed had the formula

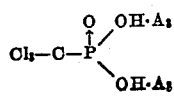

This salt was completely soluble in mineral oil and possessed excellent extreme pressure properties. Using two mols of t-$C_{12}H_{25}NH_2$ to t-$C_{15}H_{35}NH_2$ ($A_1$) in forming the above type of salt, the final product had the formula

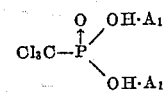

Another excellent extreme pressure additive having good oil solubility was prepared in the manner described above using only half the stoichiometric amount of amine ($A_3$) required to neutralize the total acidity of trichloromethanephosphonic acid. The product formed had the formula

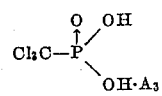

The partial and neutral primary highly-branched-chain amine salts which are specifically preferred include: t-$C_{12}H_{25}NH_2$, t-$C_{12}H_{25}NH_2$ to t-$C_{15}H_{31}NH_2$, t-$C_{18}H_{37}NH_2$ to t-$C_{24}H_{49}NH_2$, dimethyl neopentylcarbinyl amine, tert. tridecylamine salts of trichloromethanephosphonic acid, 1,1 - dichloroethanephosphonic acid, 1,1-dibromobutanephosphonic acid, trichlorobenzenephosphonic acid, tribromomethanephosphonic acid, trifluoromethanephosphonic acid, tribromomethanephosphonic acid, trichloromethane-dithiophosphonic acid, chlorobenzene trichloromethanephosphinic, 1,1 - dichloroethanethiophosphonic acid, trichlorobenzenephosphonic acid, trichloromethanephosphinic acid, dibromoethanephosphinic acid, and mixtures thereof.

Base oils to which agents of this invention are added may be selected from a variety of natural oils such as paraffinic, naphthenic, and mixed base mineral oils having a viscosity range such as from 50 at 100° F., SUS, to up to 250 SUS at 210° F. In addition, synthetic oils may be used such as polymerized olefins, alkylated aromatics; polyalkyl silicone polymers, e. g., liquid dimethyl silicone polymer, other silicone polymers; $H_2S$-adducts of unsaturated ethers and thioethers, e. g., $H_2S$ adduct of diallyl ether; esters, e. g., di(2-ethylhexyl) sebacate. Mixtures of natural and synthetic oils can be used. Under certain conditions of lubrication, minor amounts of a fixed oil such as castor oil, lard oil and the like, may be admixed with a hydrocarbon oil and/or synthetic oil.

The amine salts or organo phosphorus compounds of this invention can be used in any of the above oily media in amounts of from 0.1% to 10% and preferably from 0.2% to 5% by weight.

Table II contains the results obtained on certain additives which were evaluated: (1) in the L-19 and L-20 engine test as described in the 1946 CRC Handbook published by the Coordination Research Council; (2) in the Four-Ball Extreme Pressure Test (Engineering, vol. 136, July 13, 1933); and (3) for their solubility and stability in mineral oils in concentrations of 0.4% Cl by storing them under different temperature conditions and observing whether any phase separation occurs.

TABLE II

[Mineral oil base, additive present in amount of 0.4% Cl.]

| Additive | Test Results | | 4-Ball Test (1,800 R.P.M.; 10 sec. steel on steel, ambient temp.) | Stability | | | |
|---|---|---|---|---|---|---|---|
| | L-19 | L-20 | | 65-70° F. | Time | 20-25° F. | Time |
| A₃ ¹ salt of trichloromethane phosphonic acid (TAN) ² | Passed | Passed | 126-141 | Clear fluid, no separation. | 6 mo. | Same | 6 mo. |
| A₂ ¹ salt of trichloromethane phosphonic acid (TAN) | do | do | 126-141 | do | 6 mo. | Same | 6 mo. |
| A₃ ¹ salt of trichloromethane phosphonic acid (SAN) ² | do | do | 126-141 | do | 6 mo. | Same | 6 mo. |
| A₂ ¹ salt of trichloromethane phosphonic acid (SAN) | do | do | 126-141 | do | 6 mo. | Same | 6 mo. |
| Dimethylneopentyl carbinyl amine salt of trichloromethane phosphonic acid (TAN). | do | do | 126-141 | do | 6 mo. | Same | 6 mo. |
| Mono(di-2-ethylhexylamine) salt of trichloromethane phosphonic acid (TAN). | do | do | 126-141 | Heavy sludge or gel. | ½ day | Same | 6 mo. |
| Octadecylamine (straight chain) salt of trichloromethane phosphonic acid (TAN). | Failed | do | 89-100 | do | 1 day | Same | 1 day. |
| Trichloromethane phosphonic acid | Too insoluble to test. | | | do | immediate | Same | immediate. |
| Armeen 2HT ³ salt of trichloromethane phosphonic acid (TAN). | | | | do | 1 day | Same | 1 day. |

¹ Note Table I.
² TAN=Total Acidity Neutralized, SAN=Strong Acidity Neutralized.
³ Armeen 2HT (Armour C₁₇C₁₈ secondary straight-chain fatty amine).

Compositions of this invention can be combined with other additives in lubricants, such as anti-oxidants, corrosion inhibitors, wear inhibitors, blooming agents, pour point depressants or viscosity improvers, anti-foaming agents, e. g., dimethyl silicone polymer and the like.

Anti-oxidants comprise several types, for example, alkyl phenols such as 2,4,6-trimethyl phenol, pentamethyl phenol, 2,4-dimethyl-6-tertiarybutyl phenol, 2,4-dimethyl-6-octyl phenol, 2,6-ditertiary-butyl-4-methyl phenol, 2,4,6-tri-tertiary-butyl phenol and the like; amino phenols as N-benzylaminophenols; amines such as N,N'-dibutyl-p-phenylene diamine, diphenylamine, N-phenyl-beta-naphthylamine, N-phenyl-alpha-naphthylamine, dinaphthylamine.

Corrosion inhibitors or anti-rusting compounds may also be present, such as dicarboxylic acids of 16 and more carbon atoms; organic compounds containing acidic radicals in close proximity to a nitrile, nitro or nitroso group (e. g., alpha cyano stearic acid).

Wear reducing agents which may be used comprise: esters of phosphorus acids such as triaryl-, alkyl hydroxyl aryl, or aralkyl-phosphates, thiophosphates or phosphites and the like; neutral aromatic sulfur compounds of relatively high boiling temperatures such as diaryl sulfides, diaryl disulfides, alkyl aryl disulfides, e. g., diphenyl sulfide, diphenol sulfide, dicresol sulfide, dixylenol sulfide, methyl butyl diphenol sulfide, dibenzyl sulfide, corresponding di- and tri-sulfides, and the like; sulfurized fatty oils or esters of fatty acids and monohydric alcohols, e. g., sperm oil, jojoba oil, etc.; in which the sulfur is strongly bonded; sulfurized long chain olefins such as may be obtained by dehydrogenation or cracking of wax; sulfurized phosphorized fatty oils or acids, phosphorus acid esters having sulfurized organic radicals, such as esters of phosphoric or phosphorus acids with sulfurized hydroxy fatty acids; chlorinated hydrocarbons, such as chlorinated paraffin aromatic hydrocarbons, terpenes, mineral lubricating oil, etc.; or chlorinated esters of fatty acids containing the chlorine in position other than the alpha position.

Additional ingredients may comprise oil-soluble urea or thiourea derivatives, e. g., urethanes, allophanates, carbazides, carbazones, etc.; polyisobutylene polymers, unsaturated polymerized esters of fatty acids and monohydric alcohols and other high molecular weight oil-soluble compounds.

Depending upon the primary additives used and conditions under which they are used, the amount of secondary additives used may vary from 0.01 to 2% or higher.

The additive combination can also be used to improve and stabilize gasoline, kerosene, fuel oils, turbine oils, process oils, industrial oils, waxes, asphalts, hydraulic fluids, heat transfer fluids, fireproofing compositions, insecticidal and fungicidal compositions, rusting and corrosion inhibiting compositions, emulsions, resins and the like.

We claim as our invention:

1. A lubricating composition comprising a major amount of a mineral lubricating oil and from about 0.1% to 10% of a tertiary branched aliphatic primary alkyl-amine trichloromethanephosphonate, said amine portion of the salt containing at least 8 carbon atoms and having the structural formula

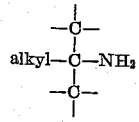

2. A lubricating composition comprising a major amount of a mineral lubricating oil and from about 0.1% to 10% of a tertiary branched aliphatic primary alkyl-amine trichloromethanephosphonate, the amine portion of the salt being selected from the group consisting of 1,1,3,3 - tetramethylbutylamine, 1,1,3,3,5,5 - hexamethylhexylamine 1,1,3,3,5,5,7,7-octamethyloctylamine, 1,1,3,3,-5,5,7,7,9,9-decamethyldecylamine, and

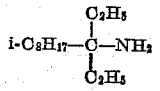

3. A lubricating composition comprising a major amount of a mineral lubricating oil and from about 0.1% to 10% of

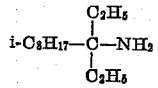

salt of trichloromethanephosphonic acid.

References Cited in the file of this patent

UNITED STATES PATENTS 2,683,691   Thorpe et al. _____ July 13, 1954